US010709255B2

(12) United States Patent
Huang et al.

(10) Patent No.: US 10,709,255 B2
(45) Date of Patent: Jul. 14, 2020

(54) INFLATION IDENTIFICATION CONNECTOR AND AIR MATTRESS SYSTEM HAVING SAME

(71) Applicant: APEX MEDICAL CORP., New Taipei (TW)

(72) Inventors: David Huang, New Taipei (TW); Wen-Bin Shen, New Taipei (TW); Ju-Chien Cheng, New Taipei (TW); Ming-Heng Hsieh, New Taipei (TW); Fu-Wei Chen, New Taipei (TW); Chih-Kuang Chang, New Taipei (TW); Yi-Ling Liu, New Taipei (TW); Sheng-Wei Lin, New Taipei (TW); Chung-Yi Lin, New Taipei (TW)

(73) Assignee: APEX MEDICAL CORP., New Taipei (TW)

( * ) Notice: Subject to any disclaimer, the term of this patent is extended or adjusted under 35 U.S.C. 154(b) by 0 days.

(21) Appl. No.: 16/174,542

(22) Filed: Oct. 30, 2018

(65) Prior Publication Data

US 2019/0142180 A1 May 16, 2019

(30) Foreign Application Priority Data

Nov. 13, 2017 (TW) ............................ 106139226 A

(51) Int. Cl.
*G06K 19/00* (2006.01)
*A47C 27/08* (2006.01)
*A61G 7/057* (2006.01)

(52) U.S. Cl.
CPC .......... *A47C 27/083* (2013.01); *A47C 27/082* (2013.01); *A47C 27/084* (2013.01); *A61G 7/05776* (2013.01); *A61G 2203/30* (2013.01); *A61G 2203/34* (2013.01); *A61G 2205/20* (2013.01)

(58) Field of Classification Search
USPC ........................ 235/375, 435, 439, 454, 487
See application file for complete search history.

(56) References Cited

U.S. PATENT DOCUMENTS

2009/0106905 A1* 4/2009 Ochi .................. A47C 27/082
5/713

* cited by examiner

*Primary Examiner* — Matthew Mikels
(74) *Attorney, Agent, or Firm* — WPAT, PC

(57) ABSTRACT

An inflation identification connector and an air mattress system having the same is provided. The inflation identification connector is insertable into a connection seat of a gas delivery host. The connection seat has a light detection component coupled to a controller disposed in the gas delivery host. The inflation identification connector includes a body and an identification structure. The detection result of the light detection component depends on the identification structure and thus is conducive to identification. Upon its insertion into the connection seat, the inflation identification connector is identified by the gas delivery host, enhancing ease of use and protecting manual operation against mistakes. The gas delivery host is not only applicable to different types of air mattresses but also conducive to streamlined management of the air mattress system and reduction of management costs and risks.

5 Claims, 17 Drawing Sheets

INFLATION IDENTIFICATION CONNECTOR AND AIR MATTRESS SYSTEM HAVING SAME

BACKGROUND OF THE INVENTION

Field of the Invention

The present disclosure relates to technology of parts and components for use in gas delivery and technology of gas delivery control and, more particularly, to an inflation identification connector operating in conjunction with a gas delivery host and an air mattress system.

Description of the Prior Art

As a form of medical equipment, air mattresses are not only inflatable mattresses but also lend appropriate support to bedridden patients and patients having to lie in bed for a long time but unable to change position by themselves and assist these patients in changing body position.

Regarding their supportive function, these medical-class air mattresses have air cells therein, and pressure in the air cells is controlled in such a manner to ensure that the pressure, i.e., interface pressure, between a patient's skin and the mattress can be maintained at an ideal level; hence, the patient's skin and subcutaneous tissues are not compressed and predisposed to poor blood circulation, and thus the likelihood that the patient will get bedsores is minimal. Regarding their body position changing function, the air mattresses have their air cells inflated and deflated adjustably and thus controlled differently, thereby assisting the patient's body in changing position.

An air mattress system essentially comprises a bed with air cells and a gas delivery host for controlling the internal pressure of the air cells. The bed has therein a gas pipeline for connecting the air cells and deflation valves. Owing to integration of various parts and components into a control mode, the patient lying on the air mattress is provided with a comfortable recumbent environment.

The control mode and various parts and components in the air mattress system vary with symptom or patient need; hence, their configuration, for example, quantity and position of the air cells, in the air mattress bed depends on an anticipated function thereof. Furthermore, depending on gas-supplying mode, the gas delivery host varies from the type of air mattress to the type of air mattress; for example, each type of air mattress requires a gas delivery host with firmware of a corresponding gas-supplying mode. As a result, different types of air mattresses cannot share a gas delivery host. For this reason, buyers incur high costs. Furthermore, the air mattress system incurs high management costs and faces difficulties in equipment management. As a result, hospital and health care institutions whose nursing services rely upon air mattress systems intensively find it inconvenient to manage so many types of air mattresses and corresponding gas delivery hosts.

SUMMARY OF THE INVENTION

It is an objective of the present disclosure to enhance ease of use of an inflation identification connector and an air mattress system.

Another objective of the present disclosure is to preclude erroneous operation.

Yet another objective of the present disclosure is to not only reduce wear and tear of the connector and connection seat but also reduce failure rate and error rate.

Still yet another objective of the present disclosure is to reduce costs and risks in equipment management of the air mattress system.

In order to achieve the above and other objectives, the present disclosure provides an inflation identification connector, for inserting into a connection seat of a gas delivery host, the connection seat having a light detection component coupled to a controller disposed in the gas delivery host, the inflation identification connector comprising a body and an identification structure. The body accommodates a gas pipeline which a gas provided by the gas delivery host passes through. The identification structure is disposed on the body such that, upon insertion of the inflation identification connector into the connection seat, the light detection component performs light detection on the identification structure and generates an identification result signal, allowing the gas delivery host to exercise related control.

In an embodiment, the identification structure is defined by a surface formed on the body.

In an embodiment, the body has a rib which the identification structure is disposed on.

In an embodiment, the body has a rib which the identification structure is disposed on. The rib is defined by a surface formed on the body, and the identification structure is defined by a surface of the rib formed on the body.

In an embodiment, the body has a rib, whereas the identification structure has a first identification structure and a second identification structure. The light detection component generates the identification result signal with the first identification structure and the second identification structure, the first identification structure being defined by a surface formed on the body, and the second identification structure being defined by a surface formed on the rib.

In an embodiment, the identification structure has a surface structure feature. The surface structure feature is selectively a rough surface or a flat surface such that the light detection component receives light reflecting off the identification structure in accordance with an attribute of the surface structure feature and performs light detection according to intensity of the light received.

In an embodiment, the body has a rib with the identification structure. In one aspect, the identification structure has a through hole penetrable by the rib and a light-blocking element disposed in the through hole and selectively demountable on a one-time basis. In another aspect, the identification structure is a through hole with a mounting portion, allowing a light-blocking element to be mounted on the mounting portion selectively, so as to conceal the through hole selectively. In yet another aspect, depending on the identification result signal required, the identification structure selectively has a through hole penetrable by the rib.

In an embodiment, the body and the rib are integrally formed.

In order to achieve the above and other objectives, the present disclosure provides an air mattress system, comprising a gas delivery host and an air mattress. The gas delivery host comprises: a controller, a gas-supplying device coupled to the controller, and a connection seat having a light detection component, wherein the light detection component is coupled to the controller, and the connection seat has a plurality of ports connected to the gas-supplying device. The air mattress comprises a plurality of air cells, a plurality of gas pipelines and an inflation identification connector, wherein the gas pipelines each have an end connected to corresponding ones of the air cells and another end connected to the inflation identification connector, the inflation identification connector being insertable into the connection seat of the gas delivery host, wherein the inflation identification connector comprises: a body for accommodating the other ends of the gas pipelines, wherein a plurality of openings corresponding in position to the gas pipelines is disposed at an end of the body to guide the gas pipelines in connecting to corresponding ones of the ports upon the insertion of the inflation identification connector into the connection seat; and an identification structure disposed on the body and configured to undergo light detection performed by the light detection component upon the insertion of the inflation identification connector into the connection seat, the light detection component generating an identification result signal in accordance with the identification structure. The controller of the gas delivery host identifies the air mattress according to the identification result signal and executes a corresponding operation mode.

In an embodiment, the operation mode operating in the air mattress system comprises a configuration. The configuration allows the controller to control the gas-supplying device to perform at least one of processes as follows: an inflation process based on an inflation pressure level configured, an inflation process based on an inflation time period configured, an over-inflation process based on an inflation delay time period configured, a low-pressure alert process based on a low-pressure alert pressure level configured, a continuous low-pressure alert process based on a low-pressure continuation time period configured, an automatic pressure-adjusting process based on an air cell adjustment mode configured, and a corresponding information displaying process based on an air mattress type configured.

In an embodiment, the light detection component of the air mattress system comprises a light detector corresponding in number to the identification structure and disposed on a side of the connection seat to perform light detection on the identification structure upon insertion of the inflation identification connector into the connection seat.

Therefore, the inflation identification connector and the air mattress system, disclosed in embodiments of the present disclosure, are advantageous in that the inflation identification connector has an identification structure to be sensed with a light detection component on a connection seat of a gas delivery host upon connection of the inflation identification connector and the connection seat, so as to achieve identification. The gas delivery host performs related control according to the identification result. Users only need to connect the inflation identification connector and the connection seat in order for the gas delivery host to perform identification. Therefore, the present disclosure not only enhances ease of use but also precludes erroneous manual operation. Furthermore, the present disclosure employs a light sensing technique to start the air mattress system by non-electrical contact to therefore not only reduce wear and tear of the connector and connection seat but also reduce failure rate and error rate. In addition, the air mattress connected is identified in accordance with the gas delivery host and switched to a corresponding operation mode and configuration. Therefore, the gas delivery host is not only applicable to different types of air mattresses but also conducive to streamlined management of the air mattress system and reduction of management costs and risks.

DETAILED DESCRIPTION OF THE EMBODIMENTS

Objectives, features, and advantages of the present disclosure are hereunder illustrated with specific embodiments, depicted with drawings, and described below.

Words, such as “comprise”, “include”, “have” and any equivalent thereof, used herein are not restricted to elements disclosed herein. Instead, the words may be descriptive of any elements which are not expressly disclosed herein but are required for the components, structures, products, devices or systems.

Words, such as “a”, “an” and “one”, used herein are descriptive of the components, structures, pipes, devices, and hosts to not only facilitate illustration but also define generally the scope of the present disclosure. Therefore, unless otherwise specified expressly, the words must be interpreted to mean “one” or “at least one” and thereby describe a singular noun or a plural noun.

Ordinal numbers, such as “first” and “second”, used herein are intended to distinguish or correlate identical or similar components or structures and do not necessarily imply what order the components or structures are in in terms of space or time. It is understood that in some situations or arrangements the ordinal numbers may be swapped without affecting the effects of implementation of the present disclosure.

The word "body" used herein means a major portion of a physical structure and comprises an upper cover and a lower cover as needed. The covers are, for example, demountably connected to form the body or integrally formed to form the body. Alternatively, the covers are connected to, fixedly engaged with or integrally formed with the other components or structures to form the body.

The word "engage" used herein must be interpreted in the broadest way comprehensible by persons skilled in the art to provide definitions including but not limited to: direct connection of two structures (the two structures are in contact with each other without any intermediate third structure therebetween); and indirect connection of two structures (an intermediate third structure is disposed between the two structures.)

Unless otherwise specified, any intervening step(s) may come between steps described herein without affecting the effect of implementation of the present disclosure.

Figure 1:
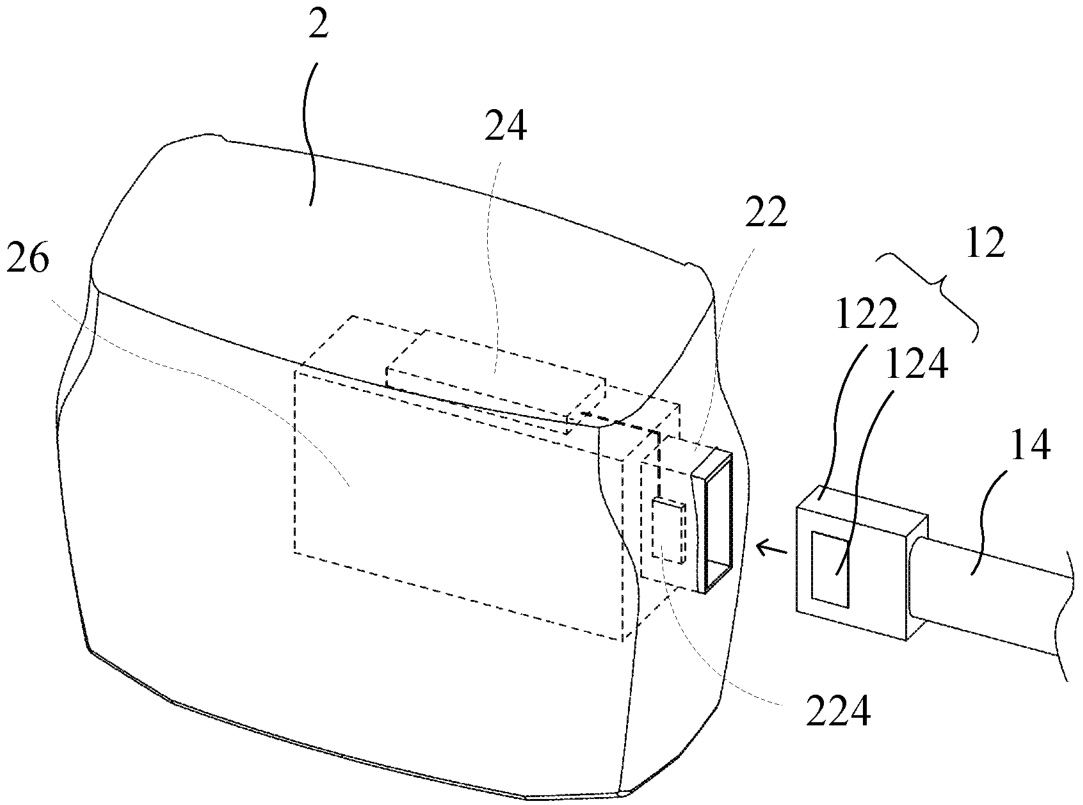
FIG. 1 is a schematic view of an inflation identification connector and a gas delivery host according to an embodiment of the present disclosure.

Referring to FIG. 1, there is shown a schematic view of an inflation identification connector and a gas delivery host according to an embodiment of the present disclosure.

The gas delivery host 2 has therein a controller 24, a gas-supplying device 26 coupled to the controller 24, and a connection seat 22 with a light detection component 224. The controller 24 is coupled to an external control panel (not shown) or an external control module (not shown) of the gas delivery host 2. When a user operates the external control module or the external control panel, the external control module or the external control panel generates an operation command signal. The controller 24 receives the operation command signal and thus generates a control command signal for controlling an operation mode of the gas delivery host 2. The operation mode varies from the type of air mattress to the type of air mattress; hence, the corresponding controllable range (adjustable by the user) varies from the type of air mattress to the type of air mattress. As a result, the controller 24 of the gas delivery host 2 has to identify the type of air mattress connected.

The gas-supplying device 26 may be a pump. Alternatively, the gas-supplying device 26 comprises a collection device formed as a result of a combination of solenoid valves and a pump. The gas-supplying device 26 receives the control command from the controller 24 and thus performs an operation accordingly, for example, begins supplying gas, begins deflation, stops supplying gas, stops deflation, and performs inflation and deflation in a specific mode. The gas-supplying operation is performed with a pump. The deflation operation is performed with the solenoid valves to form a deflation gas passage. The arrangement of components in the gas delivery host 2 shown in FIG. 1 only serves an illustrative purpose, and thus any other arrangement is also applicable to the gas delivery host 2 disclosed in this embodiment of the present disclosure.

The controller 24 in the gas-supplying device 26, the gas-supplying device 26, the external control module and the external control panel disclosed in this embodiment serve an illustrative purpose and provide a general description of the arrangement of components in the gas delivery host 2 and related control relationships, but the other arrangements are also applicable to the gas delivery host 2 disclosed in this embodiment.

The inflation identification connector 12 is inserted into the connection seat 22 of the gas delivery host 2. The inflation identification connector 12 guides a gas pipeline 14 and thus connects to the gas delivery host 2; hence, the gas delivery host 2 adjusts internal pressure of air cells (not shown in FIG. 1) of the air mattress connected to the other end of the gas pipeline 14 by inflation/deflation control. The gas pipeline 14 shown in FIG. 1 serves an illustrative purpose, and the gas pipeline 14 is implemented as a single gas pipeline or a plurality of gas pipelines.

Referring to FIG. 1, the inflation identification connector 12 comprises a body 122 and an identification structure 124. The body 122 is insertable by the gas pipeline 14 to guide one end of the gas pipeline 14 in connecting to the gas delivery host 2 correctly. A gas provided by the gas delivery host 2 passes through the gas pipeline 14; alternatively, air cells of the air mattress connected to the other end of the gas pipeline 14 are deflated by the control of the gas delivery host 2. Therefore, in some deflation modes, the gas from the air cells passes through the gas pipeline 14, and then the gas is discharged from the gas pipeline 14 by controlling the solenoid valves in the gas delivery host 2, so as to finish performing the operation of deflation and thus control the degree of deflation precisely.

Referring to FIG. 1, the identification structure 124 is disposed on the body 122. Upon insertion of the inflation identification connector 12 into the connection seat 22, the light detection component 224 performs light detection on the identification structure 124. After performing the light detection, the light detection component 224 generates and sends an identification result signal to the controller 24 coupled to the light detection component 224. Hence, owing to the identification structure 124, the controller 24 can identify the type of air mattress connected and thus performs adjustment thereon to enter a corresponding control mode which spares the user the hassle of performing manual identification and configuration adjustment and allows the user to directly further adjust the gas delivery host 2 already automatically adjusted to operate in the corresponding control mode.

The light detection component 224 can detect the presence of signals and strength of signals, because light can be blocked, is likely to reflect off a flat surface, and is unlikely to reflect off a rough surface. Owing to the body 122 of the inflation identification connector 12, it is feasible to detect the presence of effect of the detection light emitted from the light detection component 224 and, if any, the degree of the effect and thus detect the presence/absence of a difference between the reflection light received by the light detection component 224 and the detection light emitted from the light detection component 224 and, if any, the degree of the difference, thereby effectuating identification in accordance with the result of the aforesaid detection.

Figure 2:
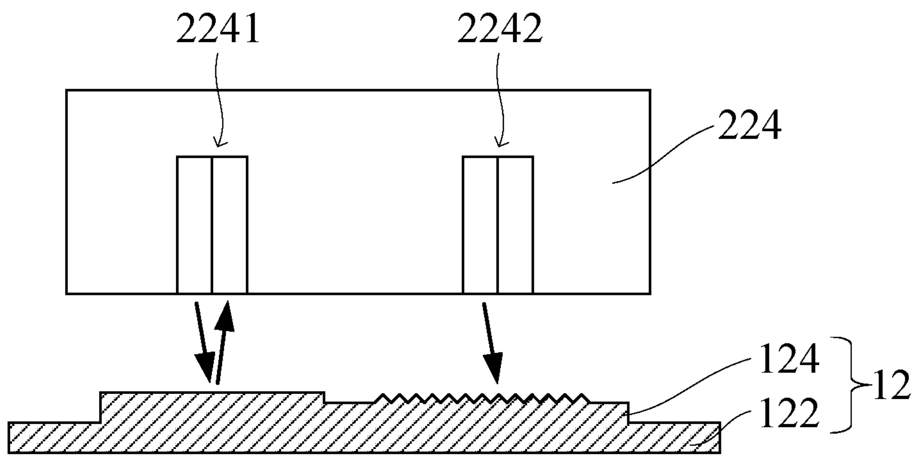
FIG. 2 is a schematic view of the inflation identification connector according to the first embodiment of the present disclosure and a light identification process.

FIG. 2 is a schematic view of the inflation identification connector according to the first embodiment of the present disclosure and a light identification process. In the first embodiment of the inflation identification connector 12, the identification structure 124 and the body 122 of the inflation identification connector 12 are integrally formed. The identification structure 124 is directly formed on the surface of the body 122. In another embodiment, the identification structure 124 is a sticker or covering directly adhered to the surface of the body 122 or is a plate or block engaged with and thus fixed to the surface of the body 122. The purpose of the sticker, covering, plate and block is to alter the degree of light reflection and even allow/disallow the light reflection.

In the first embodiment of the inflation identification connector 12, depending on the number of types of air mattresses to be identified, for example, detection points are formed on the surface of the body 122. For instance, as shown in FIG. 2, two light detectors 2241, 2242 of the light detection component 224 emit detection light toward two detection points on the surface of the body 122, respectively, and the two detection points correspond in position to two types of surfaces (a flat surface and a rough surface) at the very least, respectively, thereby yielding at least four identification results at the very least. The states in which the light detectors 2241, 2242 receive and do not receive reflection light are denoted with the digit 1 and the digit 0, respectively; hence, an identification result signal for the situation shown in FIG. 2 is denoted with the digits 10, and the other possible identification result signals for situations not shown include the digits 01, 00 and 11. Therefore, a gas delivery host corresponds in position to four different inflation identification connectors. In addition, by further distinguishing the strength of the reflection light, the two light detectors 2241, 2242 yield even more identification results.

Since the control mode and various parts and components in the air mattress system vary with symptom or patient need, their configuration, for example, quantity and position of the air cells, in the air mattress bed depends on an anticipated function thereof. However, in practice, the aforesaid differences bring about plenty problems. For instance, after connecting a type of air mattress to a gas delivery host, the user, for example, a nurse, has to adjust the gas delivery host such that not only does the gas delivery host correspond in position to the type of air mattress connected, but the gas delivery host is also configured to enter a control mode which matches the gas delivery host. After changing to another type of air mattress, the user has to operate the gas delivery host such that the gas delivery host is configured to enter a control mode which matches the gas delivery host. The aforesaid way of operation not only depends on whether the user identifies the type of air mattress correctly but also depends on whether the user configures the gas delivery host correctly; hence, the aforesaid way of operation poses high mistake-induced risks. In this embodiment of the present disclosure, the inflation identification connector 12 and the gas delivery host 2 together achieve self-identification and corresponding adjustment and prevent the user from making mistakes in operating the identification air mattress.

Figure 3:
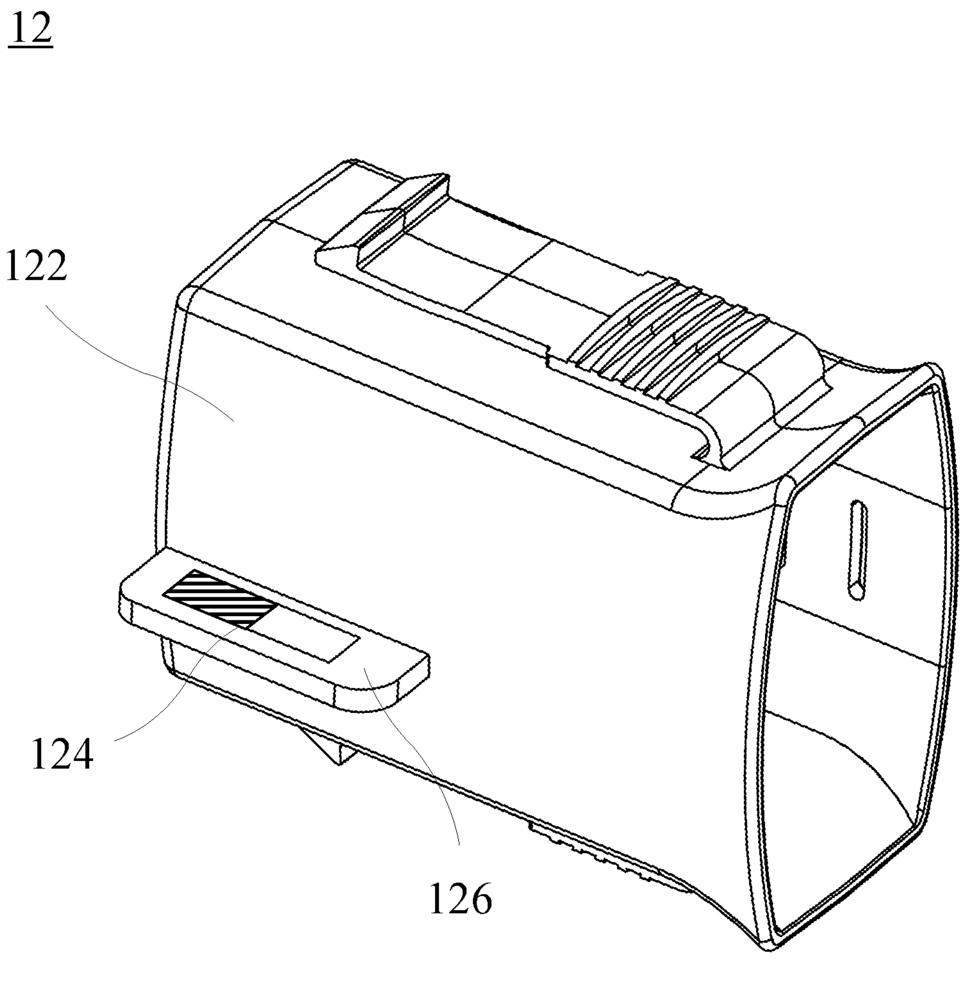
FIG. 3 is a schematic view of the inflation identification connector according to the second embodiment of the present disclosure.

Referring to FIG. 3, there is shown a schematic view of the inflation identification connector according to the second embodiment of the present disclosure. In the second embodiment, the inflation identification connector 12 further comprises a rib 126 disposed on the body 122, wherein the identification structure 124 is disposed on the rib 126. Referring to FIG. 3, the identification structure 124 is disposed on the sidewall of the rib 126, whereas the connection seat 22 of the gas delivery host 2 has a corresponding recess for receiving the rib 126 on the body 122 as soon as the rib 126 protrudes as a result of insertion of the inflation identification connector 12 into the connection seat 22 of the gas delivery host 2. The direction in which the light detection component 224 points at must be changed accordingly.

In the second embodiment of the inflation identification connector, the rib 126 disposed on the body 122 is integrally formed with the body 122 or fixed to the body 122 by being inserted into or engaged with (not shown in FIG. 3) the body 122.

Figure 4:
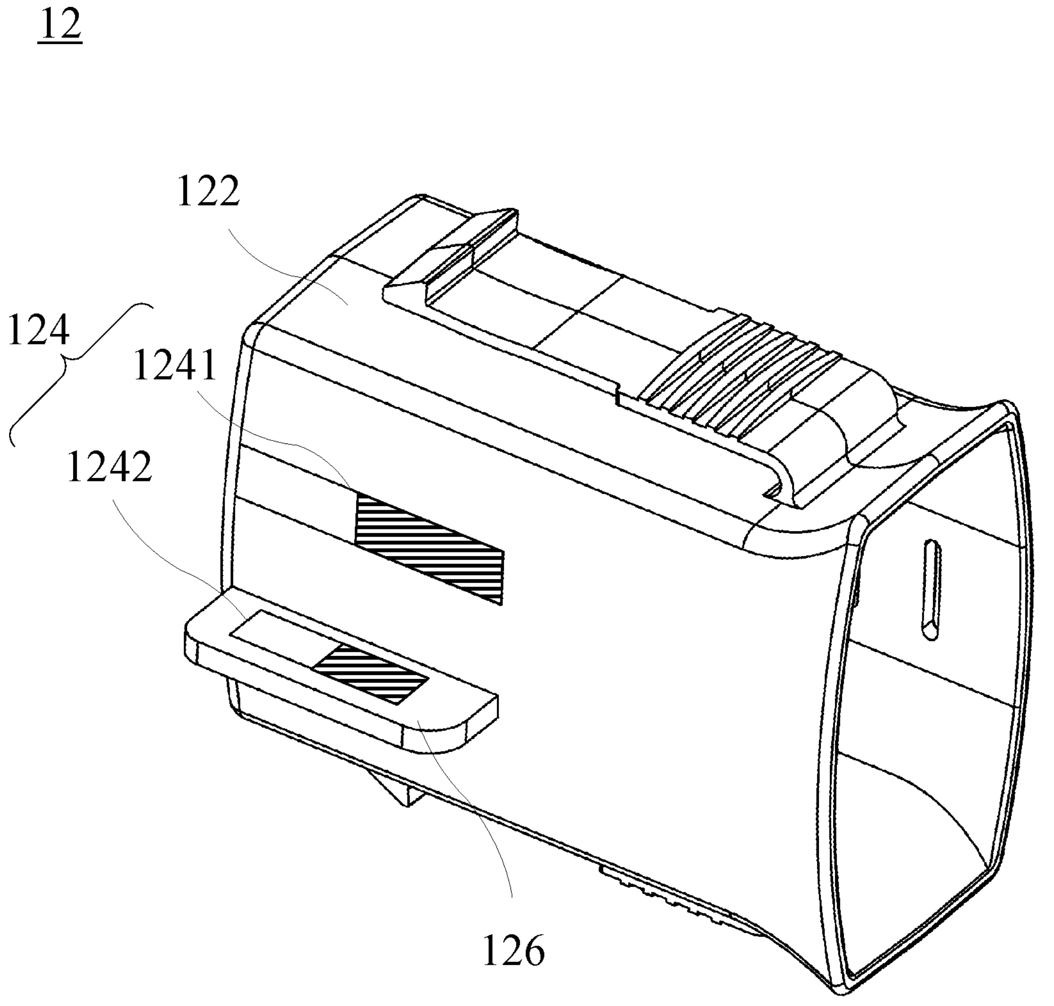
FIG. 4 is a schematic view of the inflation identification connector according to the third embodiment of the present disclosure.

Referring to FIG. 4, there is shown a schematic view of the inflation identification connector according to the third embodiment of the present disclosure. In the third embodiment, the inflation identification connector 12 further comprises a rib 126 disposed on the body 122, wherein the identification structure 124 comprises a first identification structure 1241 and a second identification structure 1242. The first identification structure 1241 is defined on the surface of the body 122. The second identification structure 1242 is defined on the surface of the rib 126. In the third embodiment, the identification structures defined on the surfaces of the body 122 and the rib 126 of the inflation identification connector 12 demonstrate the feasibility of combinations.

In the first, second and third embodiments of the inflation identification connector, the identification structures are disposed on only the surface of the body 122, only the surface of the rib 126, or both the surface of the body 122 and the surface of the rib 126. The rib is mounted on the body 122 or integrally formed with the body 122. The identification structures are mounted on the rib 126 or integrally formed with the rib 126. The identification structure 124, as shown in FIG. 2, has a surface structure feature, and the surface structure feature is selectively a rough surface or a flat surface. Depending on an attribute of the surface structure feature, the light detection component 224 receives light reflecting off the identification structure 124 and identifies the received light according to intensity of the received light.

Figure 5:
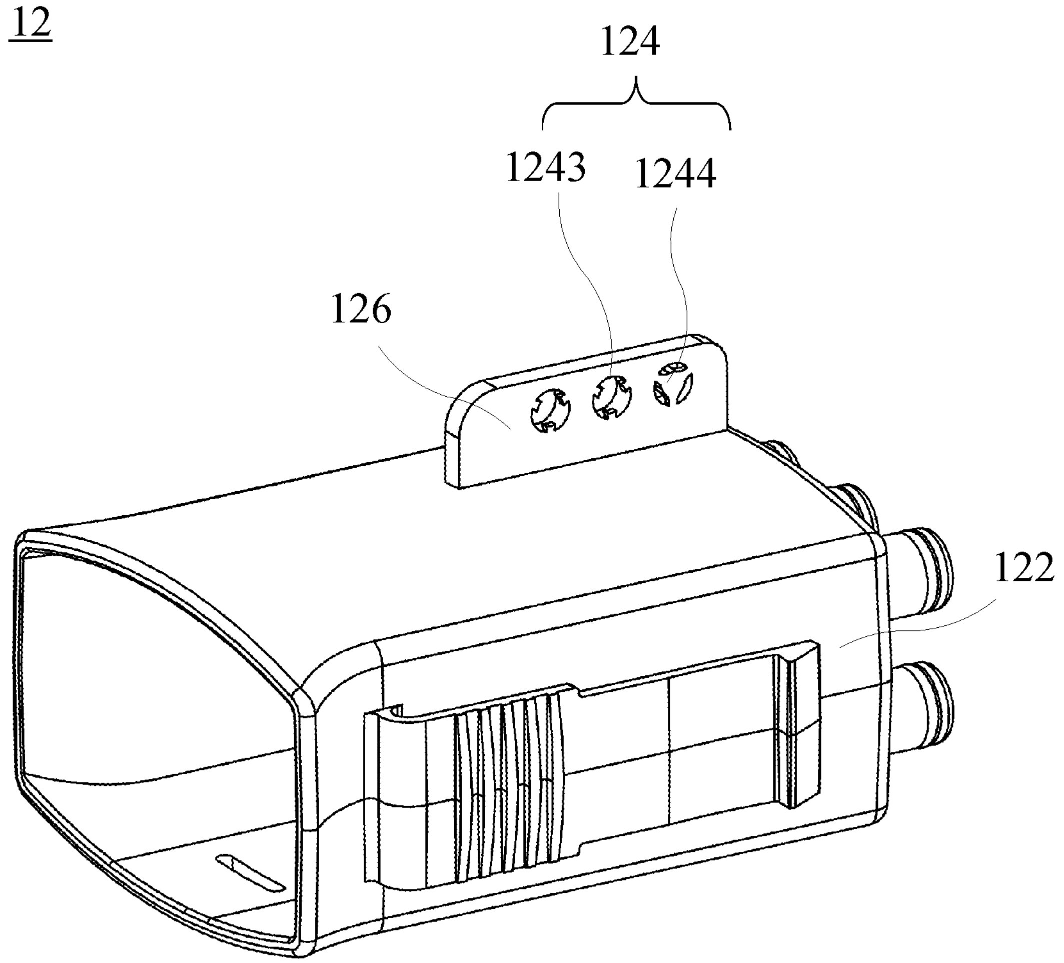
FIG. 5 is a schematic view of an identification structure according to the first embodiment of the present disclosure.

Referring to FIG. 5, there is shown a schematic view of an identification structure according to the first embodiment of the present disclosure. The rib 126 disposed on the body 122 of the inflation identification connector 12 has the identification structure 124. The identification structure 124 comprises: a through hole 1243 penetrable by the rib 126, and a light-blocking element 1244 disposed in the through hole 1243. In this embodiment, the light-blocking element 1244 is integrally formed with the through hole 1243 from inside and thus can be demounted on a one-time basis such that, after it has been confirmed that the inflation identification connector 12 is applied to the model number or type of air mattress, partial demounting, whole demounting, or no demounting can be carried out, so as to enhance the ease of matching.

Figure 6:
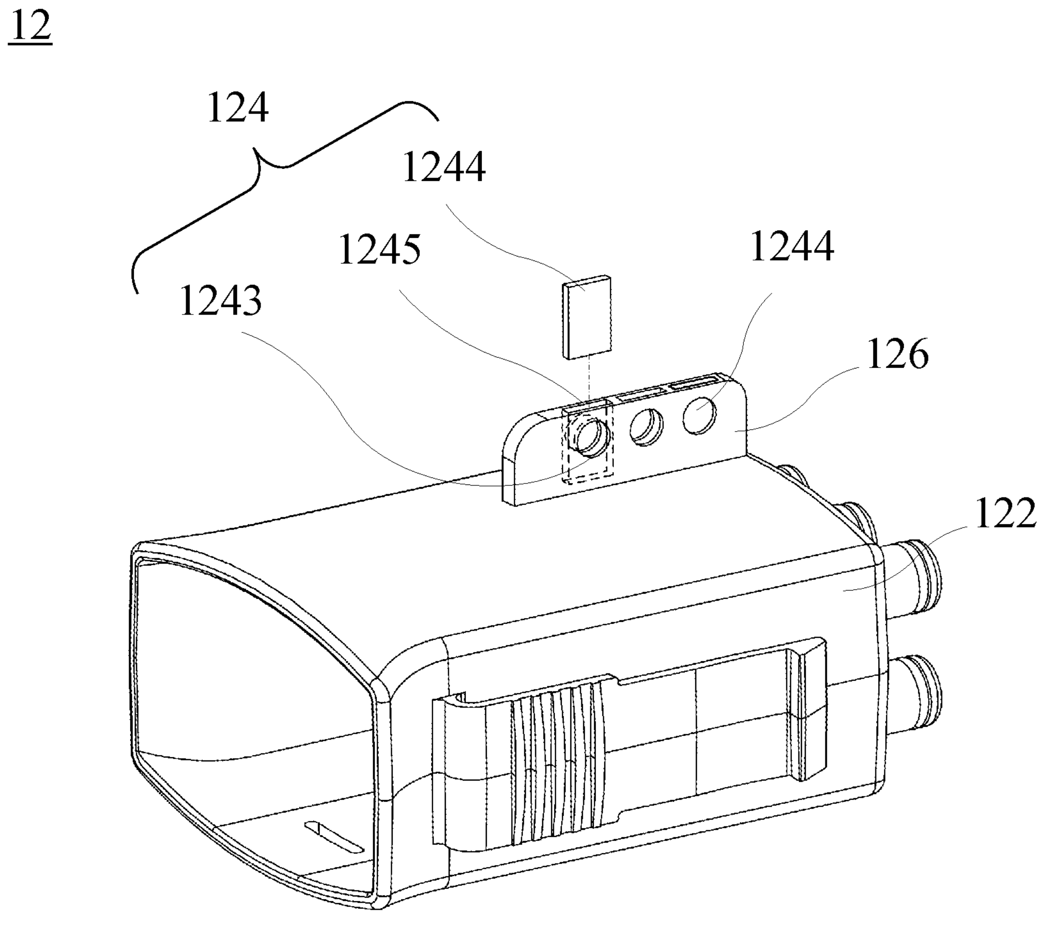
FIG. 6 is a schematic view of the identification structure according to the second embodiment of the present disclosure.

Referring to FIG. 6, there is shown a schematic view of the identification structure according to the second embodiment of the present disclosure. The rib 126 disposed on the body 122 of the inflation identification connector 12 has the identification structure 124. The identification structure 124 has a mounting portion 1245. The mounting portion 1245 has the through hole 1243. The light-blocking element 1244 is selectively mounted on the mounting portion 1245 to selectively conceal the through hole 1243. In this embodiment, the light-blocking element 1244 is implemented as an externally-mounted component and thus can be repeatedly demounted or mounted, thereby further providing multiple ease of matching. For instance, the mounting portion 1245 is a groove formed around the through hole 1243 to allow the plate-shaped light-blocking element 1244 to be mounted therein. Alternatively, the mounting portion 1245 is a slot (shown in FIG. 6) formed by hollowing out the rib 126 such that the plate-shaped light-blocking element 1244 can be mounted therein. For instance, the light-blocking element 1244 is a light attenuation plate for controlling the degree of passage of light; hence, light attenuation plates which vary in capability of attenuation are provided as needed to control intensity of the passing light. Therefore, a through hole and a mounting portion can be combined in various ways and thus is applicable to more types of air mattresses.

Figure 7:
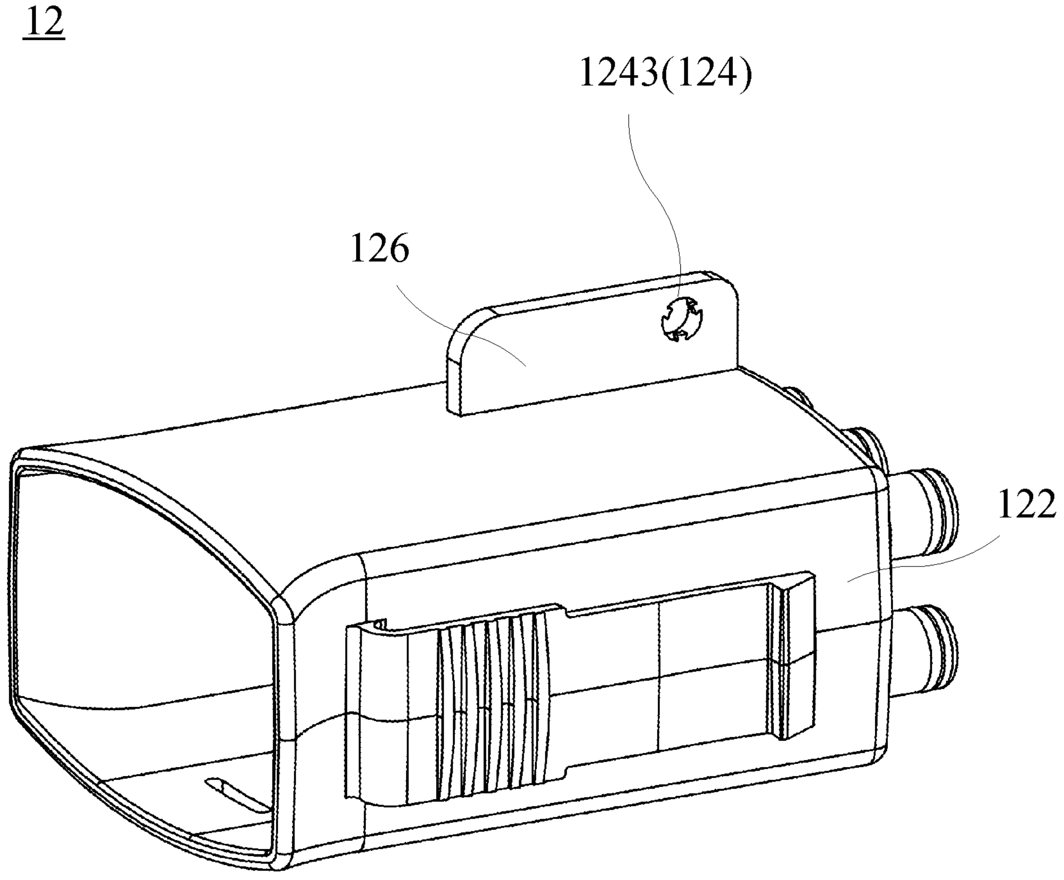
FIG. 7 is a schematic view of the identification structure according to the third embodiment of the present disclosure.

Referring to FIG. 7, there is shown a schematic view of the identification structure according to the third embodiment of the present disclosure. The rib 126 disposed on the body 122 of the inflation identification connector 12 has the identification structure 124. In this embodiment, depending on the identification result signal required, the through hole 1243 penetrable by the rib 126 is selectively disposed on the identification structure 124. Therefore, by the time the inflation identification connector 12 is produced, the quantity of the through holes 1243 required for the implementation of the identification structure 124 has been determined. Hence, the through holes 1243 are formed at every point which the detection light must pass through. Compared with FIG. 5, FIG. 7 shows just a single through hole (including confirmation of its position) which the detection light passes through and absence of any through hole at any point which the detection light need not pass through.

Figure 8:
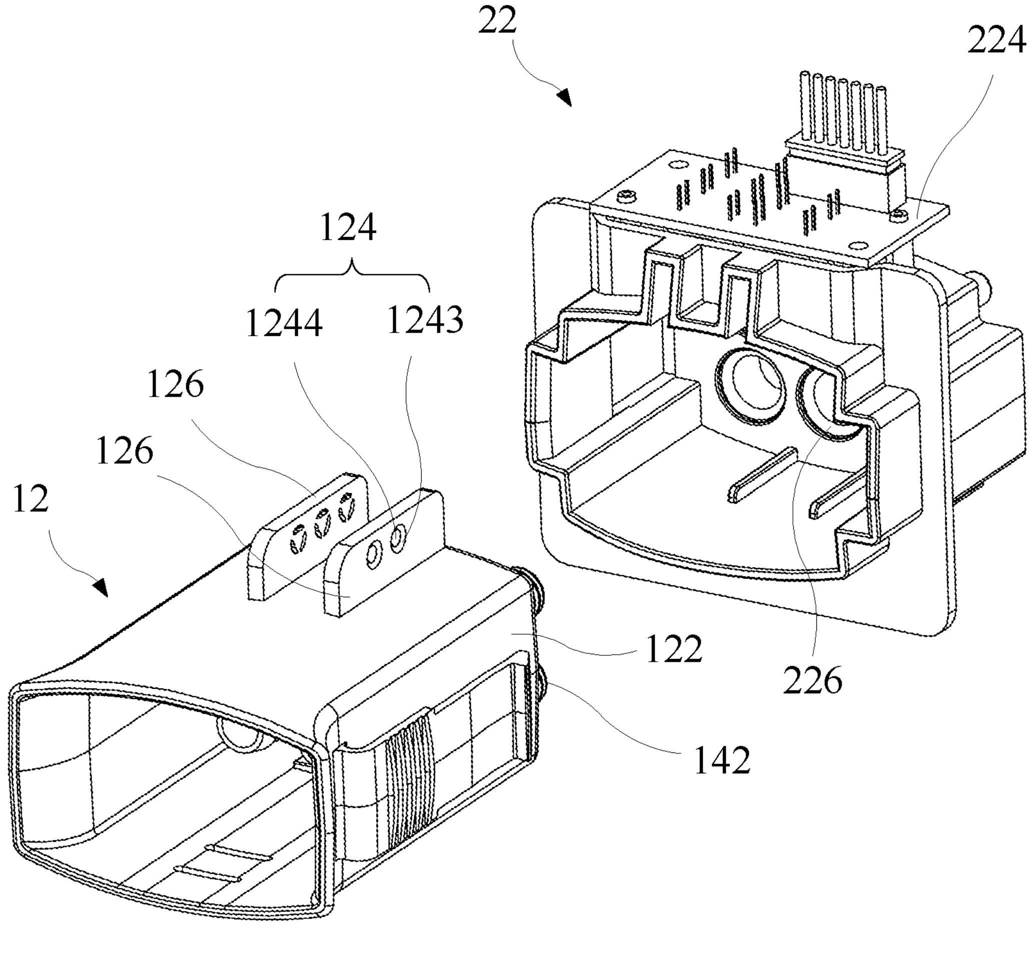
FIG. 8 is a schematic view of a connection seat of the gas delivery host and the inflation identification connector according to an embodiment of the present disclosure.

Referring to FIG. 8, there is shown a schematic view of a connection seat of the gas delivery host and the inflation identification connector according to an embodiment of the present disclosure. This embodiment illustrates the matching relationship between the inflation identification connector 12 and the connection seat 22. The inflation identification connector 12 comprises the body 122, the rib 126, and the identification structure 124 disposed on the rib 126. The connection seat 22 matches the rib 126 and the body 122 in profile such that the inflation identification connector 12 can insert into the connection seat 22. The inflation identification connector 12 further has a pipeline end port 142 connectable to the gas pipeline 14 (shown in FIG. 1 or FIG. 10). The pipeline end port 142 connects to a gas delivery port 226 in the connection seat 22 such that gas is delivered between the gas delivery host 2 and the gas pipeline 14. The gas delivery-oriented port in the connection seat 22 is provided in a plural number to correspond in quantity to the gas pipeline in the inflation identification connector of the air mattress. The light detection component 224 of the connection seat 22 has a plurality of light detectors (not shown) disposed at the identification structures 124 upon insertion of the inflation identification connector 12. An electrical connection terminal of the light detection component 224 coupled to the controller 24 sends the identification result signal to the controller 24 such that the controller 24 can identify the type of air mattress and automatically switch to a corresponding operation mode.

Figure 9:
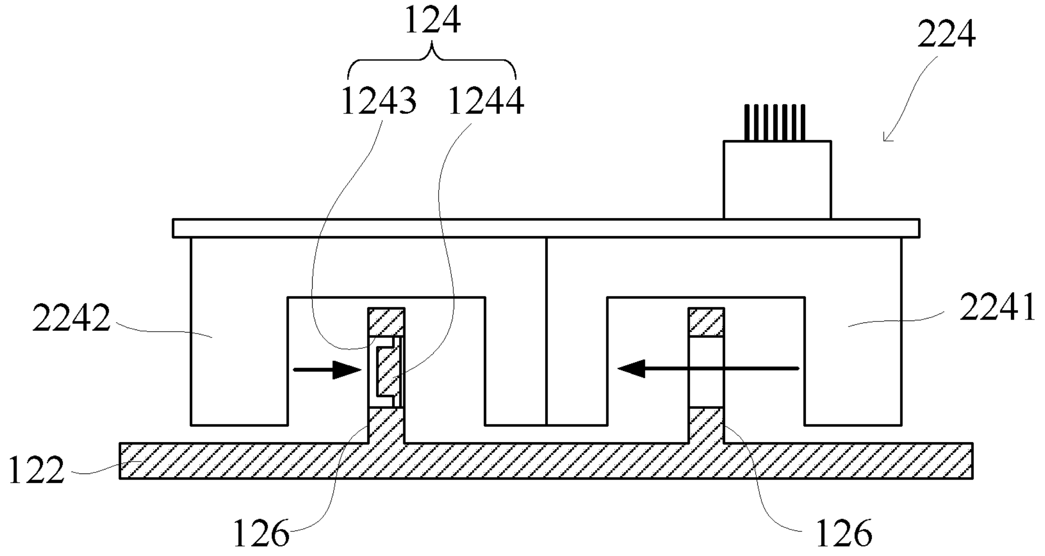
FIG. 9 is a schematic view of the light identification process according to another embodiment of the present disclosure.

Referring to FIG. 9, there is shown a schematic view of the light identification process according to another embodiment of the present disclosure. In this embodiment, the body 122 has two ribs 126. The ribs 126 each have a plurality of through holes 1243 (see FIG. 8). A light emitting end and a light receiving end of the light detector 2241 flank the through holes 1243, that is, the light detector 2241 straddles a corresponding one of the ribs 126 such that the detection light emitted from the light emitting end of the light detector 2241 reaches the light receiving end of the light detector 2241 via the through holes 1243. Therefore, when the light-blocking element 1244 is kept in the through holes 1243, the light receiving end of the corresponding light detector 2242 cannot receive the detection light to bring about the light blocking effect. In yet another aspect, when the light-blocking element 1244 is implemented as the aforesaid light attenuation plate, the light receiving end of the light detector can receive the detection light of different levels of light intensity and thus provide more detection results for use in defining the types of air mattresses.

Figure 10:
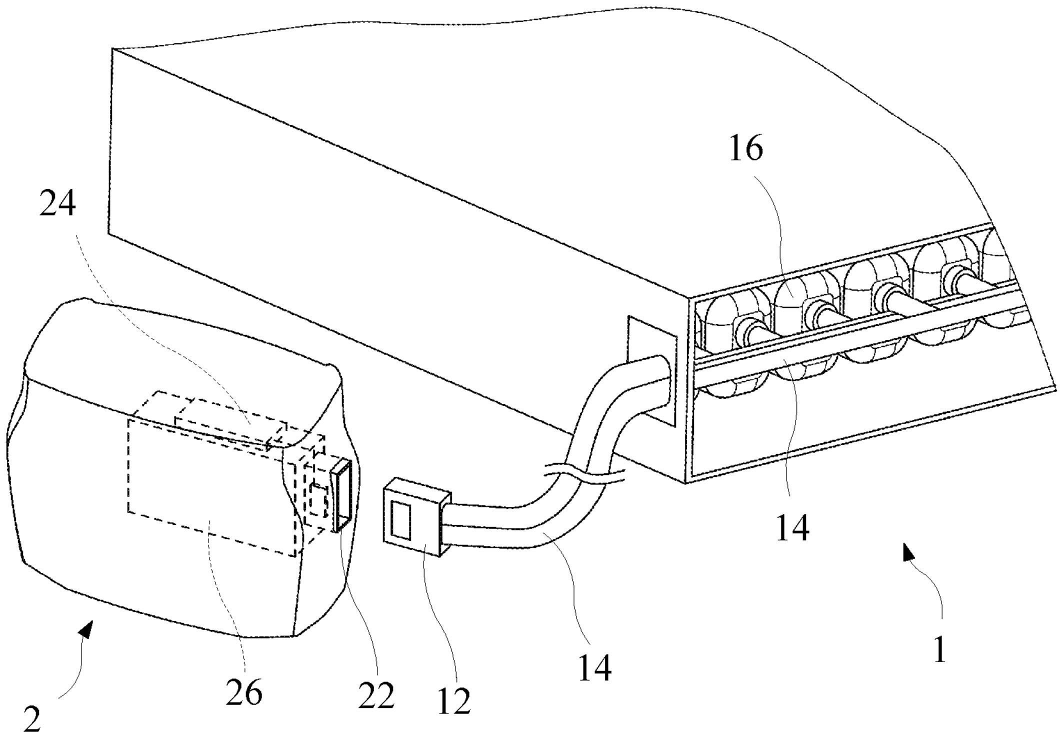
FIG. 10 is a schematic view of an air mattress system according to an embodiment of the present disclosure.

Referring to FIG. 10, there is shown a schematic view of an air mattress system according to an embodiment of the present disclosure. The air mattress system comprises an air mattress 1 and a gas delivery host 2. In this embodiment, the gas delivery host 2 is applicable to the air mattress 1 of any type, whereas the components of the gas delivery host 2 are already described above and depicted with FIG. 1 and thus are, for the sake of brevity, not described again herein. The air mattress 1 comprises a plurality of air cells 16, a plurality of gas pipelines 14 and an inflation identification connector 12. One end of each gas pipeline 14 is connected to a corresponding one of the air cells 16 (for example, the air cells are arranged in different regions, and after the gas pipelines corresponding in position to the air cells in the same region are gathered together to connect to a gas pipeline, they are connected to the gas delivery host by the inflation identification connector.) The other end of each gas pipeline 14 is connected to the inflation identification connector 12. The inflation identification connector 12 is inserted into the connection seat 22 of the gas delivery host 2. The controller 24 of the gas delivery host 2 identifies the type of the air mattress 1 connected, using the identification result signal corresponding to the inflation identification connector 12, and then executes a corresponding operation mode.

The operation mode executed by the controller 24 comprises a configuration. The configuration is a configuration parameter. Each identification connector corresponds to a corresponding one of the configuration parameters. Each configuration parameter enables the controller 24 to control the gas-supplying device 26 (shown in FIG. 1) in the gas delivery host 2 to perform at least one of the processes described below. Upon insertion of an identification connector into a connection seat, the controller 24 of the gas delivery host 2 identifies the configuration parameter to be executed, using the identification connector. The configuration parameter is selected from the processes described below and is in the number of one or more (the wordings “first sort” and “second sort” used in the examples described below are illustrative of the corresponding processes rather than restrictive of the wordings “first sort” and “second sort” used in describing the other processes.)

(1) An inflation process performed in accordance with a configured inflation pressure level, for example, entails selecting different sorts (including types and sizes) of air mattresses according to the user’s individual situation, assuming two sorts, wherein the first sort of air mattress is provided with a first inflation identification connector, and the second sort of air mattress is provided with a second inflation identification connector. Therefore, when the first sort of air mattress is in use, for example, by fat patients, the air mattress inflation pressure level is preset to 80 mm Hg. When inserted into the connection seat, the first inflation identification connector is automatically identified with the gas delivery host such that the controller is accordingly adjusted to a corresponding configuration parameter to accordingly control the gas-supplying device to operate in a corresponding mode, so as to prevent the patients from coming into contact with the bottom and thus being more likely to get bedsores. When the second sort of air mattress, for example, a conventional air mattress, is in use, the air mattress inflation pressure level is set to 60 mm Hg and thus meets the needs of patients with normal body weight. Therefore, the inflation identification connector is applicable to a control condition of pressure configuration.

(2) An inflation process performed in accordance with a configured inflation time period, for example, entails selecting different sorts of air mattresses according to the user’s individual situation. When the first sort of air mattress, for example, an air mattress with large air cells, is in use, the configuration parameter of continuous inflation of the air mattress is 30 minutes to ensure that inflation of the air mattress will be finalized. When the second sort of air mattress, for example, an air mattress with small air cells, is in use, the configuration parameter of continuous inflation of the air mattress only needs to be 20 minutes. Therefore, the inflation identification connector is applicable to a control condition of time configuration.

(3) An over-inflation process performed in accordance with a configured inflation delay time period is, for example, as follows: when the first sort of air mattress, for example, an air mattress with a large bed size, is in use, the configuration parameter enables the air mattress to be inflated for two more minutes after the gas delivery host has detected that the air mattress has been inflated to a preset target level, so as to ensure that inflation of the air mattress will be finalized; when the second sort of air mattress, for example, an air mattress with a small bed size, is in use, the configuration parameter enables the air mattress to be inflated for one more minute after the gas delivery host has detected that the air mattress has been inflated to a preset target level, so as to ensure that inflation of the air mattress will be finalized. It provides additionally a control condition of inflation delay; hence, the air mattress is precisely inflated to a target pressure level such that the gas delivery host can measure the air mattress end pressure precisely even though the detector is close to the host end.

(4) A low-pressure alert process performed in accordance with a configured low-pressure alert pressure level is, for example, as follows: when the first sort of air mattress is in use, the configuration parameter enables the gas delivery host to generate an alert upon detection that the pressure of the air mattress is lower than 40 mm Hg; when the second sort of air mattress is in use, the configuration parameter enables the gas delivery host to generate an alert upon detection that the pressure of the air mattress is lower than 30 mm Hg. Hence, the low-pressure alert process is applicable to different air mattresses and conducive to appropriate adjustment thereof.

(5) A continuous low-pressure alert process performed in accordance with a configured low-pressure continuation time period is, for example, as follows: when the first sort of air mattress is in use, the configuration parameter enables the gas delivery host to generate an alert upon detection that the pressure of the air mattress is low continuously for more than five minutes; when the second sort of air mattress is in use, the configuration parameter enables the gas delivery host to generate an alert upon detection that the pressure of the air mattress is low continuously for more than 10 minutes. Hence, the continuous low-pressure alert process is applicable to different air mattresses and provides additionally a control condition of low-pressure continuation time period.

(6) An automatic pressure-adjusting process performed in accordance with a configured air cell adjustment mode is, for example, as follows: given the same type of air mattress, air mattresses of different sizes vary in the capacity of their air cells and thus vary in the time taken to be fully inflated. The first category of pipes and the second category of pipes, which are arranged by crossing each other, are inflated and deflated whenever the user's individual situation is detected with a view to determining the pressure level most suitable for the user. After the user has lain down, both the two categories of pipes are fully inflated, and then one of the two categories of pipes is deflated; meanwhile, attention must be paid to a pressure level of the other category of pipes not deflated, and thus it is necessary to detect whether the pressure level attains a predetermined increment within a predetermined time period. If the detection is affirmative, the time taken to obtain the affirmative detection result will be regarded as a factor in performing preliminary calculation of the user's pressure level. If the detection is negative, the pressure increment attained within the predetermined time period will be regarded as a factor in performing preliminary calculation of the pressure level most suitable for the user. Therefore, when an air mattress of a large size is in use, the time taken to attain the predetermined increment will increase and thus require different corresponding configurations. Hence, when the detection result is that a predetermined increment is attained within a predetermined time period, the controller is configured to perform the first air cell adjustment mode. When an air mattress of a small size (for example, a 5-inch bed) is in use, the controller is configured to perform the first air cell adjustment mode. When an air mattress of a large size (for example, an 8-inch bed) is in use, the controller is configured to perform the second air cell adjustment mode and thereby render the air cell adjustment mode more precise. The configuration is assigned to the inflation identification connector by induction such that the controller can perform automatic identification. The more the combinations of functions of automatic identification (i.e., the more the sorts of air mattresses), the more the combinations to be provided by the identification structure.

(7) A corresponding information displaying process performed in accordance with a configured type of air mattress is, for example, as follows: depending on the type of air mattress, names of different air mattress products, lessons on operating different air mattresses, or interfaces for operating different air mattresses are shown on the screen of the gas delivery host. Therefore, after the gas delivery host has identified the type of air mattress connected, information about the corresponding air mattress is displayed on the screen of the gas delivery host.

Inflation of the air cells of a conventional air mattress requires exercising control over gas distribution by adjustment of a rotating valve such that a gas source is in communication with the gas pipelines for the air cells to be inflated. After being started, the rotating valve takes some time to finish its rotation; hence, the aforesaid control is imprecise, nor is completion of the gas distribution of the gas pipelines instant. As a result, this novel air mattress system adopts solenoid valves which substitute for a conventional rotating valve, and the solenoid valves render the control of gas distribution more precise and faster. A solenoid valve is an electrically-controlled valve which opens and shuts, because a movable iron core is driven by an electromagnetic force generated by a power supply coil; hence, its aforesaid special feature in terms of electrical driving leads to some solenoid valve failures, such as incomplete valve shutting or opening caused by insufficient electromagnetic driving force, and insufficient inflation caused by the solenoid valve failures. Therefore, a monitoring mechanism is required to detect whether the solenoid valves fail, so as to enhance the reliability of the air mattress system. To enhance the reliability of the solenoid valves in an air mattress system, the present disclosure further provides, in embodiments thereof, a solenoid valve detection method for an air mattress system and a gas delivery host in an air mattress system capable of solenoid valve detection.

Figure 11:
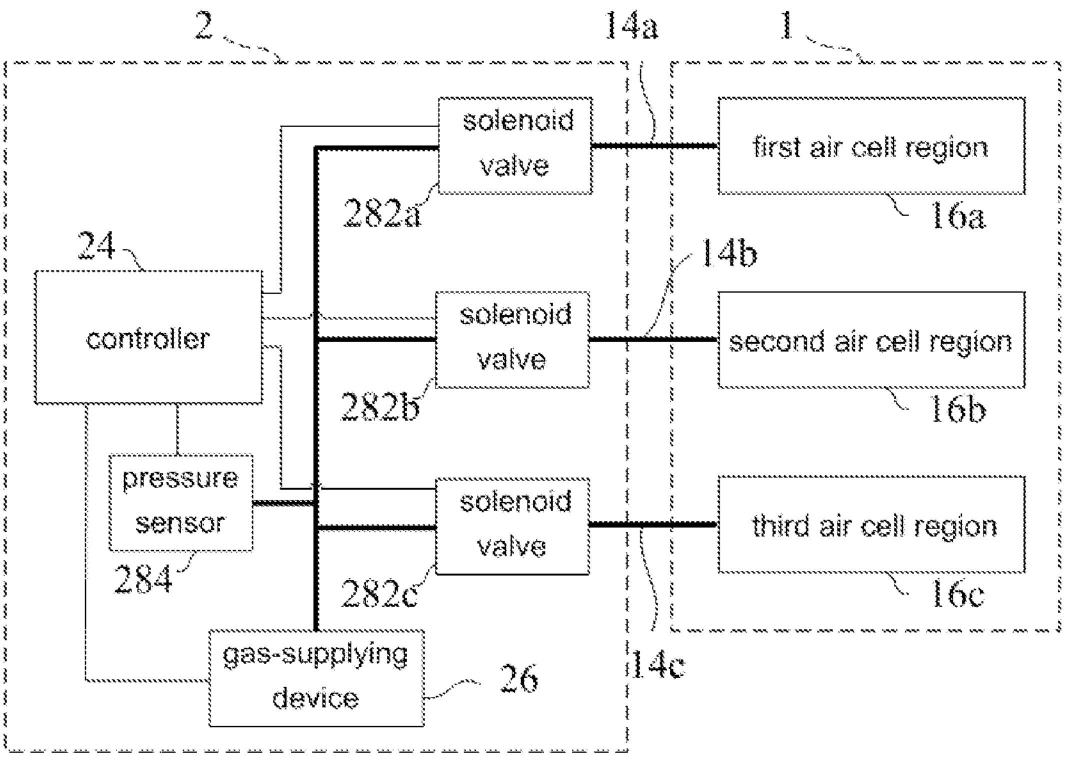
FIG. 11 is a schematic view of the air mattress system with solenoid valves according to an embodiment of the present disclosure.

Referring to FIG. 11, there is shown a schematic view of the air mattress system with solenoid valves according to an embodiment of the present disclosure. The air mattress system comprises the air mattress 1 and the gas delivery host 2. As shown in FIG. 11, air cell regions in the air mattress 1 are exemplified by first air cell region 16*a*, second air cell region 16*b* and third air cell region 16*c* which are in communication with solenoid valves 282*a*, 282*b*, 282*c* in the gas delivery host 2 by gas pipelines 14*a*, 14*b*, 14*c*, respectively. Each air cell region has therein at least one air cell to be grouped for the sake of illustration as follows: the air cells in the same group are in communication with the same solenoid valve by the same gas pipeline and thus are controlled by the same inflation or deflation mode. The solenoid valves 282*a*, 282*b*, 282*c* are each coupled to the controller 24 in the gas delivery host 2 so as to be controlled by the controller 24. The solenoid valves 282*a*, 282*b*, 282*c* each have one end connected to the gas pipelines 14*a*, 14*b*, 14*c*, respectively, and the other ends are jointly in communication with the gas-supplying device 26. A pressure sensor 284 is provided on the communication pipeline between the gas-supplying device 26 and the solenoid valves 282*a*, 282*b*, 282*c*. The pressure sensor 284 is coupled to the controller 24 and adapted to detect the gas pressure level inside the pipeline such that the controller 24 controls the opening and shutting of the solenoid valves 282*a*, 282*b*, 282*c* during the operation mode, so as to finalize the gas distribution of the air cells in the air mattress.

Figure 12:
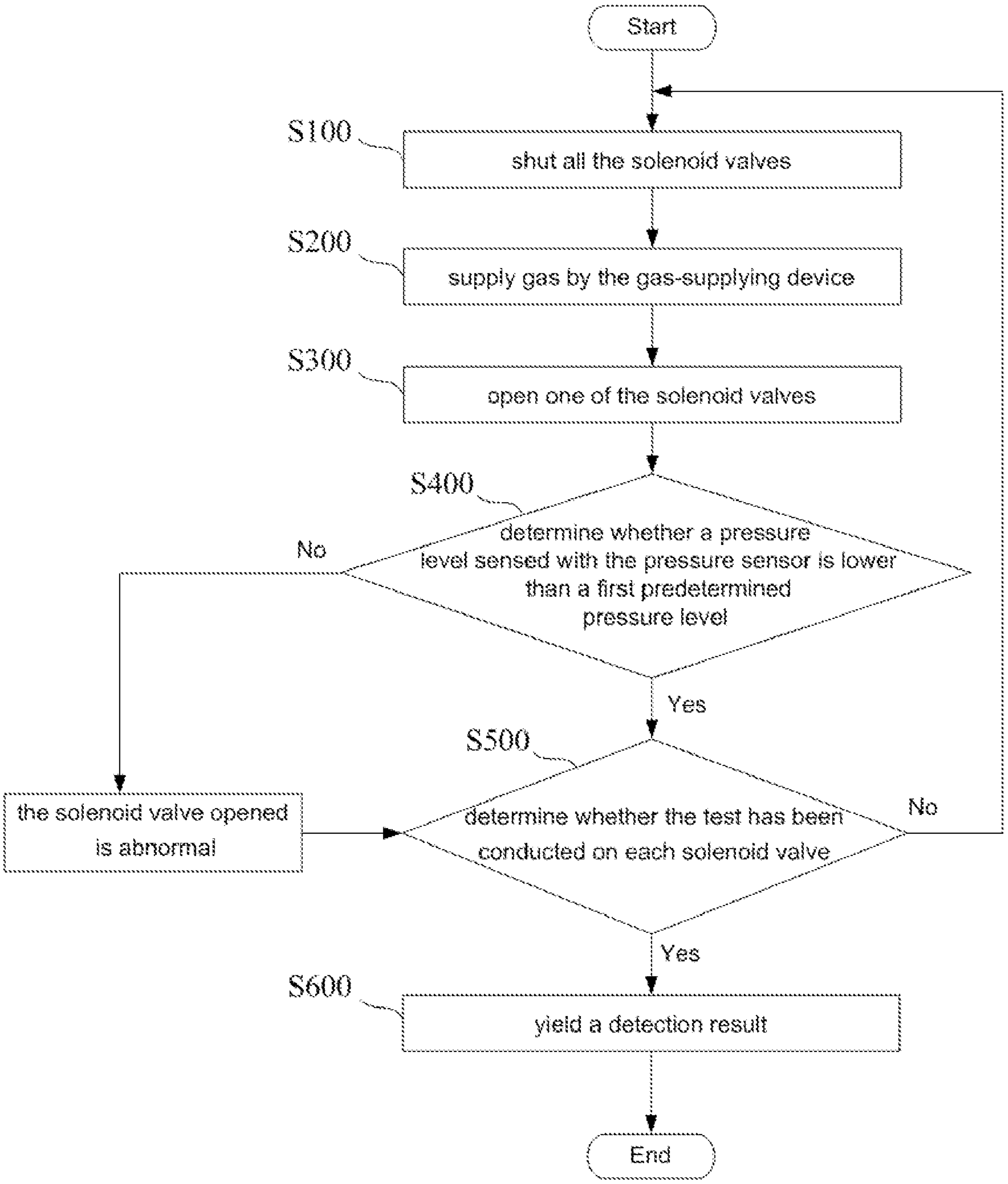
FIG. 12 is a flowchart of a solenoid valve detection method according to the first embodiment of the present disclosure.

Referring to FIG. 12, there is shown a flowchart of a solenoid valve detection method according to the first embodiment of the present disclosure. Regarding the method of detecting the solenoid valves of the air mattress system, the air mattress system comprises an air mattress having a plurality of air cells and a gas delivery host coupled to the air mattress. The gas delivery host is in communication with the air cells in the air mattress by one ends of solenoid valves disposed in the gas delivery host. The other ends of the solenoid valves are in communication with a gas-supplying device in the gas delivery host. A pressure sensor is provided on the communication pipeline between the gas-supplying device and the solenoid valves. The detection method comprises steps as follows:

S100: Shut all the solenoid valves.

S200: Supply gas for a first predetermined time period and then stop supplying gas, by the gas-supplying device.

S300: Open one of the solenoid valves to introduce the gas into a gas pipeline and the air cells; for instance, open one of the solenoid valves for a second predetermined time period before going to step S400.

S400: Determine whether a pressure level sensed with the pressure sensor is lower than a first predetermined pressure level. If "yes", it means that the solenoid valve opened is normal, then go to the next step. If "no", it means that the solenoid valve opened is abnormal and needs further determination.

S500: Determine whether the test has been conducted on each solenoid valve. If "no", go back to step S1 and open the next solenoid valve. If "yes", go to the next step; and S600: Yield a detection result.

Figure 13:
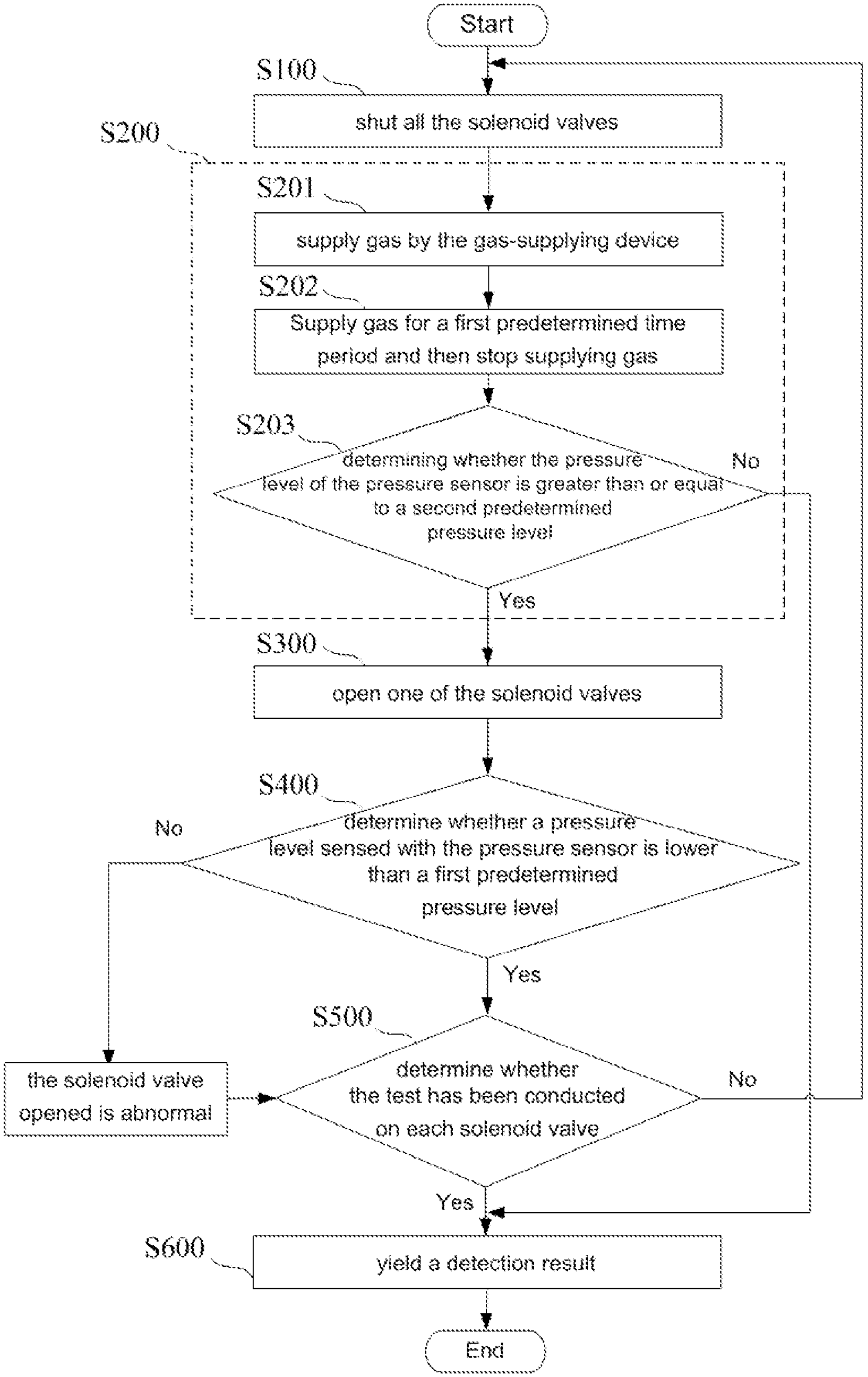
FIG. 13 is a flowchart of the solenoid valve detection method according to the second embodiment of the present disclosure.

Referring to FIG. 13, in a further embodiment, step S200 comprises step S201, step S202 and step S203 performed in sequence. In step S201, the gas-supplying device begins to supply the gas. In step S202, the gas-supplying device supplies the gas for a first predetermined time period and then stops supplying the gas. Step S203 involves determining whether the pressure level of the pressure sensor is greater than or equal to a second predetermined pressure level; if "yes", it means that the gas-supplying device is normal, and the process flow goes to step S300; if "no", it means that the gas-supplying device is abnormal, and the process flow goes to step S600 to wait for the repair or change of the gas-supplying device before undergoing detection again.

Figure 14:
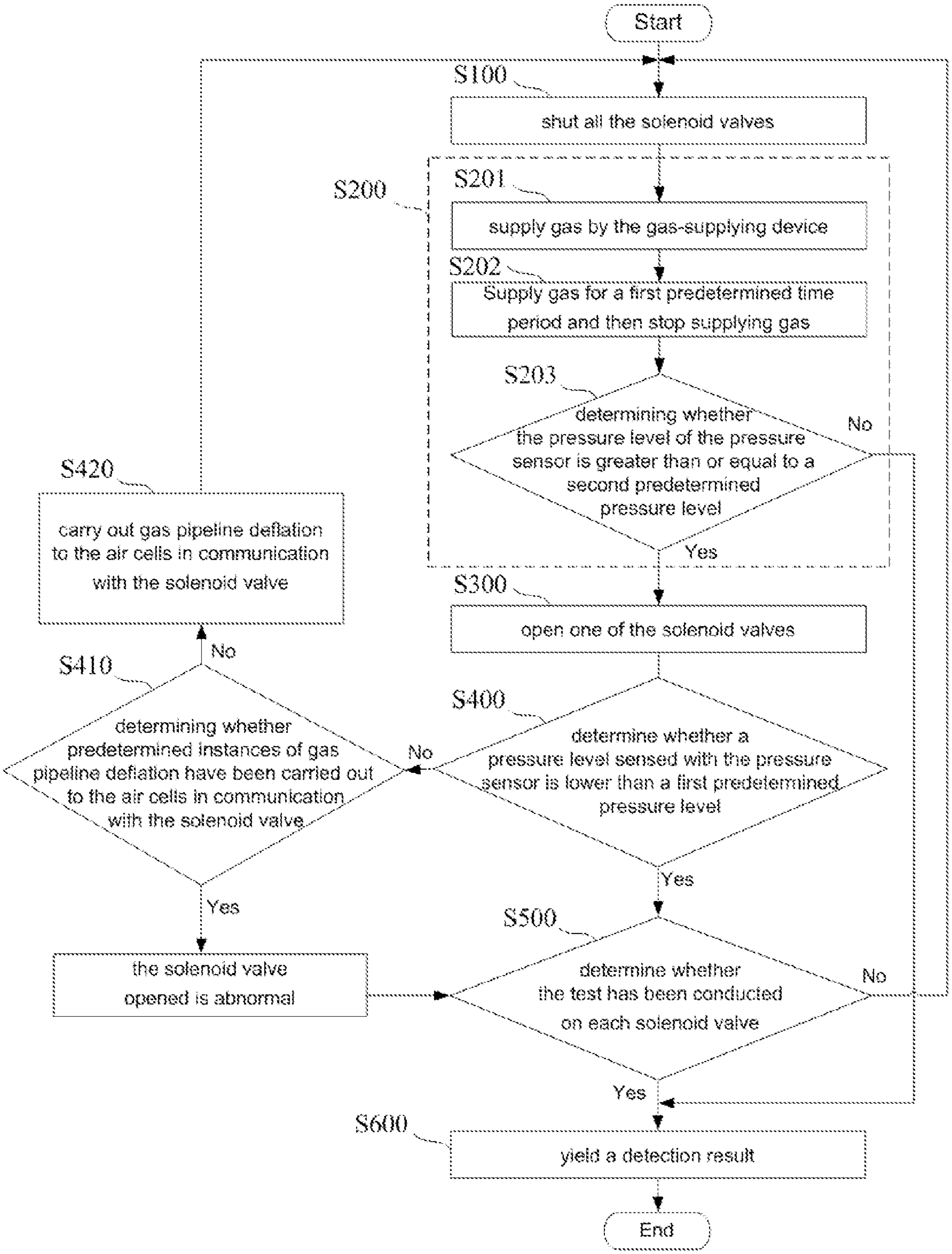
FIG. 14 is a flowchart of the solenoid valve detection method according to the third embodiment of the present disclosure.

In a further embodiment, referring to FIG. 14, the negative determination resulting from step S400 is followed by step S410. Step S410 involves determining whether predetermined instances (for example, at least two instances) of gas pipeline deflation have been carried out to the air cells in communication with the solenoid valve; if "yes", determine that the solenoid valve is abnormal and go to step S500; if "no", go to step S420 to carry out gas pipeline deflation to the air cells in communication with the solenoid valve. The gas pipeline deflation entails removing gas from the gas pipeline and the air cells in the air mattress, for example: with deflation valves in the air mattress, by opening at least one deflation solenoid valve (a deflation solenoid valve 282*x* shown in FIG. 15), or by disconnecting temporarily the air mattress from the gas delivery host.

Figure 15:
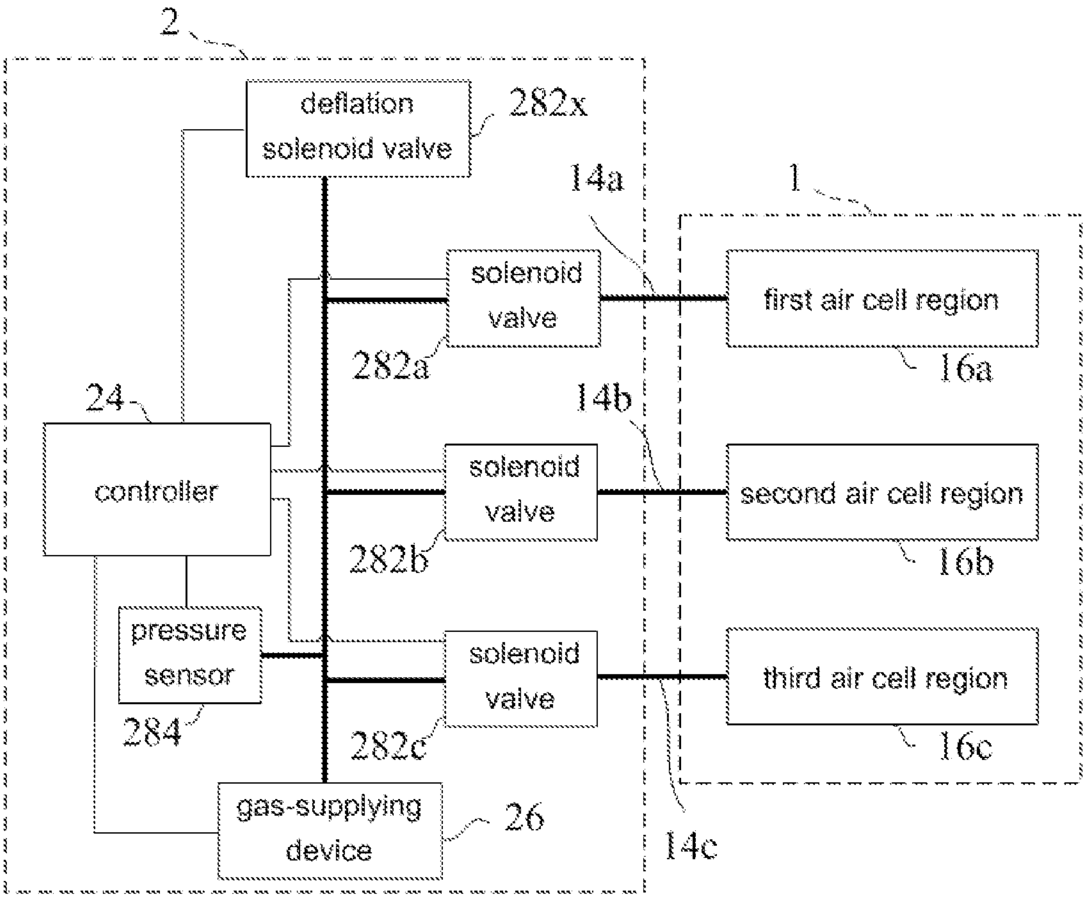
FIG. 15 is a schematic view of the air mattress system with solenoid valves according to another embodiment of the present disclosure.

In a further embodiment, referring to FIG. 15, the gas delivery host further has therein at least one deflation solenoid valve (a deflation solenoid valve 282*x* shown in FIG. 15). The deflation solenoid valve has one end in communication with a gas-supplying device in the gas delivery host and the other end being an opening such that the gas in the pipeline is released. In this embodiment, following step S500 and preceding step S600 are the steps of: shutting all the solenoid valves but opening one deflation solenoid valve; determining whether the pressure level of the pressure sensor is less than a third predetermined pressure level; if "yes", it means that the deflation solenoid valve is normal, and, if "no", it means that the deflation solenoid valve is abnormal, thereby yielding a detection result to be output together with the aforesaid detection result of the solenoid valve.

In an embodiment illustrated by FIG. 11 through FIG. 15, the first predetermined time period and the second predetermined time period, for example, are set to 1~2 seconds. The first predetermined pressure level, the second predetermined pressure level, and the third predetermined pressure level are, for example, 100 mm Hg each or 50~200 mm Hg each.

In an embodiment illustrated by FIG. 11 through FIG. 15, the aforesaid steps of the method are not only performed with a controller in the gas delivery host in the air mattress system capable of solenoid valve detection but also compiled to form a computer program product or stored in a record medium or in the memory of the gas delivery host. Upon execution of the computer program product by a computer, such as a controller, of the gas delivery host, the gas delivery host performs the aforesaid steps of the method. Alternatively, after every instance of booting the gas delivery host, the aforesaid steps of the method are performed to conduct the test without yielding a test result indicative of abnormality, before the user is allowed to begin an operation session. The embodiments of the present disclosure not only attain a gas delivery host having solenoid valves but also enhance reliability of the solenoid valves greatly so as to enhance stability of the operation of the air mattress system during inflation/deflation.

In another aspect, as shown in FIG. 11 and FIG. 15, the controller 24 controls the inflation mode of the air mattress system with solenoid valves in accordance with a pressure level sensed with the pressure sensor 284. Therefore, the capability of the air mattress system to provide a comfortable recumbent environment for a reclining user depends on the precision of the pressure level sensed. Referring to FIG. 11 and FIG. 15, compared with the air cells (16*a*, 16*b*, 16*c*)

of the air mattress, the pressure sensor 284 is close to the gas-supplying device 26 and thus likely to be affected by the gas-supplying device 26. For instance, after the gas-supplying device 26 has finished supplying gas, the pressure inside the gas pipeline has not yet reached equilibrium, and the pressure inside the gas pipeline near the gas-supplying device 26 is high; hence, the pressure level sensed with the pressure sensor 284 cannot represent pressure inside the air cells (16*a*, 16*b*, 16*c*) of the air mattress. For instance, assuming that the required pressure inside the air cells of the air mattress is 40 mm Hg, as soon as the gas-supplying device 26 is shut whenever the pressure sensed with the pressure sensor 284 is 40 mm Hg, the air cells of the air mattress have not yet fully received the gas from the gas-supplying device 26 and thus the actual pressure inside the air cells is lower than 40 mm Hg after the pressure inside the gas pipeline has reached equilibrium, and in consequence the air mattress cannot give a correct degree of support to the reclining user. In the air mattress system, to allow the pressure inside the air cells to be precisely controlled, the present disclosure discloses in an embodiment thereof an inflation control method for solenoid valves in an air mattress system and a gas delivery host capable of the inflation control and adapted for use in the air mattress system.

Figure 16:
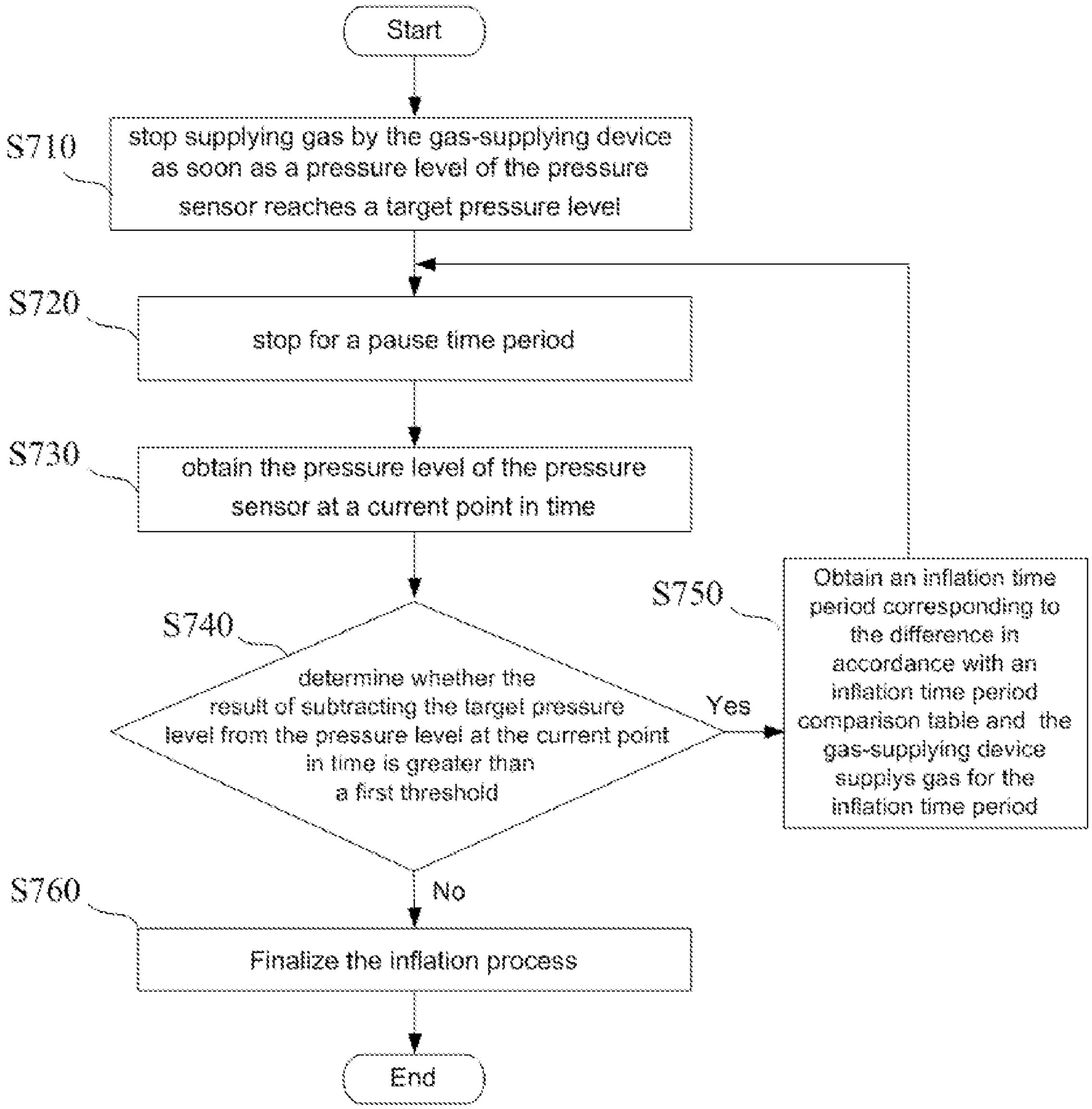
FIG. 16 is a flowchart of an inflation control method for the solenoid valves in the air mattress system according to an embodiment of the present disclosure.

Referring to FIG. 16, there is shown a flowchart of an inflation control method for the solenoid valves in the air mattress system according to an embodiment of the present disclosure. The inflation control method comprises the following steps:

S710: Stop supplying gas by the gas-supplying device as soon as a pressure level of the pressure sensor reaches a target pressure level. In general, the target pressure level is 40 mm Hg, which is the standard for air cell inflation.

S720: Stop for a pause time period. The pause time period is a waiting time period which the pressure inside the gas pipeline takes to reach equilibrium. For example, the pause time period is set to 0~2 seconds (but must be greater than 0). In a preferred embodiment, the pause time period is set to 1 second.

S730: Obtain the pressure level of the pressure sensor at a current point in time.

S740: Determine whether the result of subtracting the target pressure level from the pressure level at the current point in time is greater than a first threshold. If "yes", go to step S750. If "no", go to step S760. The first threshold may be set to 0, that is, it is only when there is no difference between the target pressure level and the pressure level at the current point in time that the inflation is full. In another embodiment, the first threshold is set to a range value, for example, −0.5~0.5, to provide a certain degree of flexibility.

S750: Obtain an inflation time period corresponding to the difference in accordance with an inflation time period comparison table such that the process flow of the method returns to step S720 after the gas-supplying device has supplied gas for the inflation time period. The inflation time period comparison table shows that, given an air mattress of different types and sizes, a specific increment of the pressure inside the gas pipeline in communication with the air cells takes an inflation time period to occur at the rated gas-supplying speed of the gas-supplying device. The increment is a graduation, such as the least graduation of 0.1 mm Hg. Given an air mattress of different types and sizes and the rated gas-supplying speed, a 0.1 mm Hg increase in pressure takes an inflation time period, thereby creating the inflation time period comparison table for use by a controller in the gas delivery host. In another embodiment, the graduation is 0.5 mm Hg or any other value.

S760: Finalize the inflation process.

Figure 17:
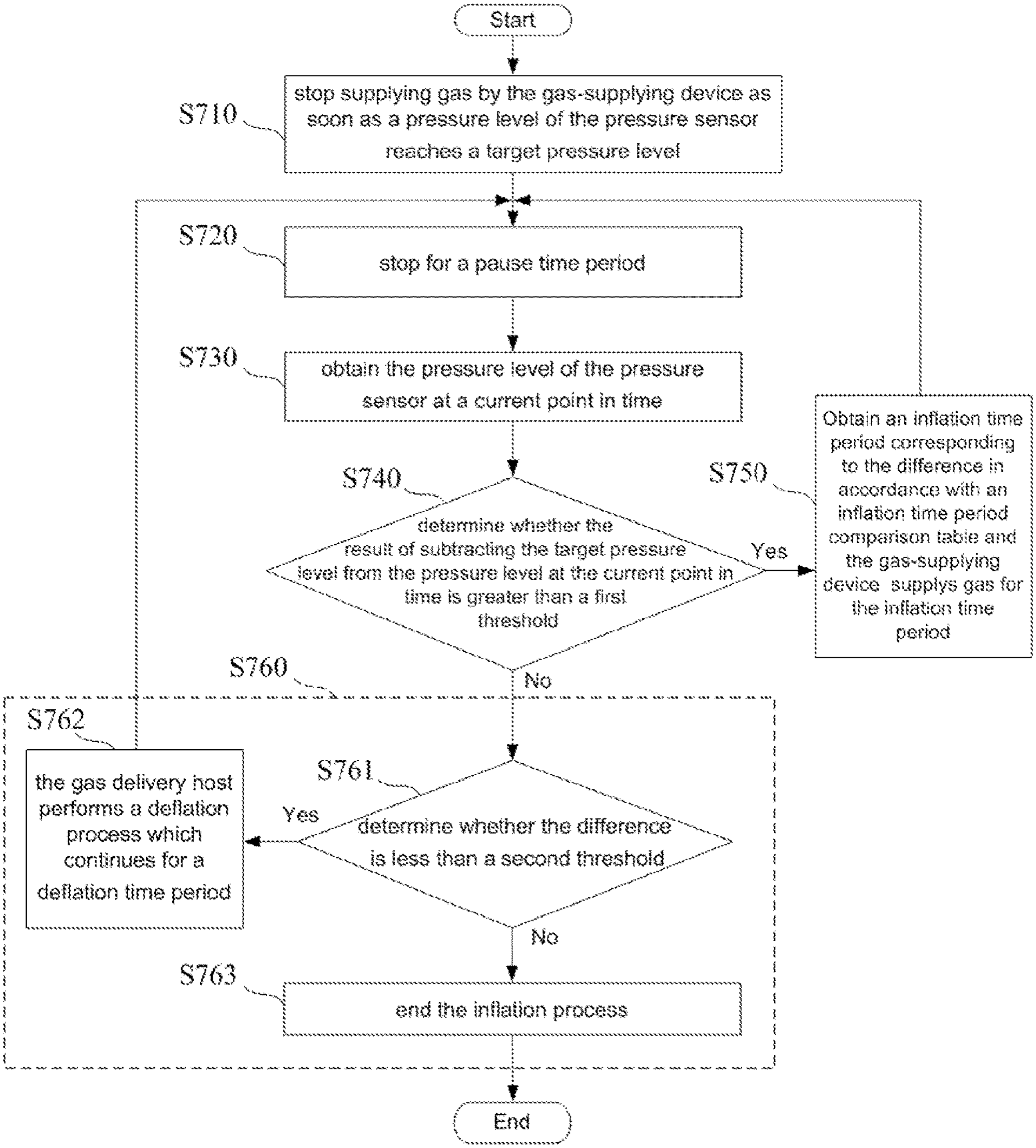
FIG. 17 is a flowchart of the inflation control method for the solenoid valves in the air mattress system according to another embodiment of the present disclosure.

Referring to FIG. 17, there is shown a flowchart of the inflation control method for the solenoid valves in the air mattress system according to another embodiment of the present disclosure. The step S760 further comprises:

S761: Determine whether the difference is less than a second threshold. If "yes", it means over-inflation, and the process flow of the method goes to step S762. If "no", go to step S763. The second threshold is −4~6, preferably −5.

S762: The gas delivery host performs a deflation process which continues for a deflation time period. After step S762, the process flow of the method returns to step S720. The deflation process is performed with the deflation solenoid valve 282*x* shown in FIG. 15. In an embodiment, the deflation time period lasts 25~30 seconds, wherein in the situation of over-inflation, the deflation process must be performed for a specific time period, no matter how small the difference (which is a negative value) is.

S763: End the inflation process.

In an embodiment illustrated by FIG. 16 and FIG. 17, the aforesaid steps of the method are not only performed with a controller in the gas delivery host capable of the inflation control and adapted for use in the air mattress system but also compiled to form a computer program product or stored in a record medium or in the memory of the gas delivery host. Upon execution of the computer program product by a computer, such as a controller, of the gas delivery host, the gas delivery host performs the aforesaid steps of the method. When the inflation process is performed with the gas delivery host, the aforesaid steps of the method achieve an objective of the aforesaid embodiment of the present disclosure, that is, controlling the pressure inside the air cells accurately and thus augmenting the precision of the inflation process of the air mattress system.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. An air mattress system, comprising:

a gas delivery host comprising a controller, a gas-supplying device coupled to the controller, and a connection seat having a light detection component, wherein the light detection component is coupled to the controller, and the connection seat has a plurality of ports connected to the gas-supplying device; and an air mattress comprising a plurality of air cells, a plurality of gas pipelines and an inflation identification connector, the gas pipelines each having an end connected to corresponding ones of the air cells and another end connected to the inflation identification connector, the inflation identification connector being insertable into the connection seat of the gas delivery host, wherein the inflation identification connector comprises:

a body for accommodating the other ends of the gas pipelines, wherein a plurality of openings corresponding in position to the gas pipelines is disposed at an end of the body to guide the gas pipelines in connecting to corresponding ones of the ports upon the insertion of the inflation identification connector into the connection seat; and an identification structure disposed on the body and configured to undergo light detection performed by the light detection component upon the insertion of the inflation identification connector into the connection seat, the light detection component generating an identification result signal in accordance with the identification structure, wherein the controller of the gas delivery host identifies the air mattress according to the identification result signal and executes a corresponding operation mode, wherein the light detection component comprises a light detector corresponding in number to the identification structure and disposed on a side of the connection seat to perform light detection on the identification structure upon insertion of the inflation identification connector into the connection seat, wherein the body further comprises a rib, and the identification structure is disposed on the rib of the body, the rib is defined by a surface formed on the body, and the identification structure is defined by a surface formed on the rib of the body.

2. The air mattress system of claim 1, wherein the operation mode comprises a configuration, the configuration allowing the controller to control the gas-supplying device to perform at least one of processes as follows: an inflation process based on an inflation pressure level configured, an inflation process based on an inflation time period configured, an over-inflation process based on an inflation delay time period configured, a low-pressure alert process based on a low-pressure alert pressure level configured, a continuous low-pressure alert process based on a low-pressure continuation time period configured, an automatic pressure-adjusting process based on an air cell adjustment mode configured, and a corresponding information displaying process based on an air mattress type configured.

3. The air mattress system of claim 1, wherein the identification structure has a surface structure feature, the surface structure feature being selectively a rough surface or a flat surface, such that the light detection component receives light reflecting off the identification structure in accordance with an attribute of the surface structure feature and performs light detection according to intensity of the light received.

4. The air mattress system of claim 1, wherein the identification structure comprising a through hole penetrable by the rib and a light-blocking element disposed in the through hole and demountable selectively on a one-time basis.

5. The air mattress system of claim 4, wherein the body and the rib are integrally formed.

* * * * *